Figure 1:
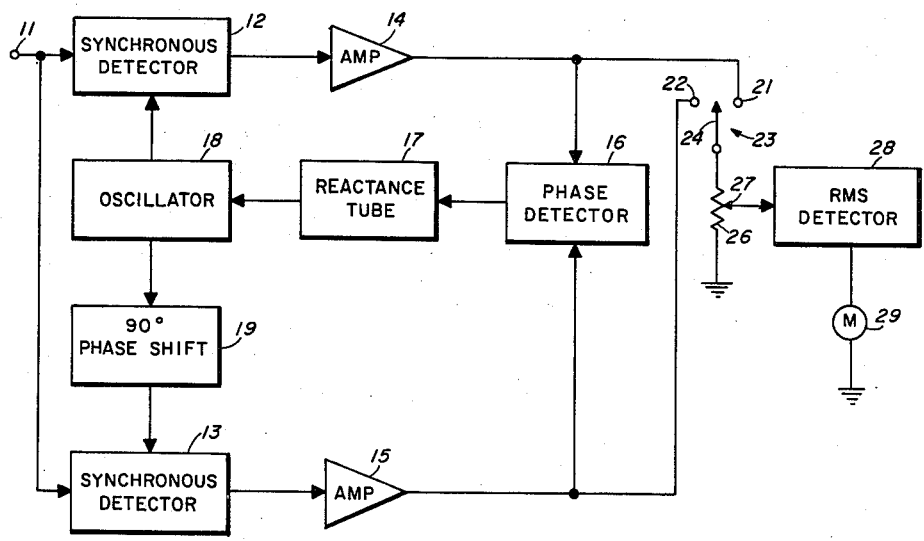

Feb. 25, 1964 W. H. JONES 3,122,704
SIGNAL-TO-NOISE RATIO INDICATOR
Filed Sept. 27, 1960

INVENTOR.
WILLIAM H. JONES
BY
ATTORNEYS

United States Patent Office 3,122,704
Patented Feb. 25, 1964

3,122,704
SIGNAL-TO-NOISE RATIO INDICATOR
William H. Jones, North Syracuse, N.Y., assignor, by mesne assignments, to the United States of America as represented by the Secretary of the Navy
Filed Sept. 27, 1960, Ser. No. 58,864
5 Claims. (Cl. 325—363)

This invention relates to a signal-to-noise ratio indicator and more particularly to a signal-to-noise ratio indicator which does not require removal of the signal during measurement.

The prior art signal-to-noise ratio indicators and signal strength meters were of two general types yielding two types of information. The "s" type meter merely measured the output of the receiver in decibels, but included the noise along with the signal which did not yield truly a signal strength reading or a signal-to-noise ratio measurement. To calculate signal-to-noise ratio it was necessary to record the signal strength plus noise and then remove the signal and record the noise reading alone. The noise reading was then obtained by subtracting from the signal plus the noise reading and the ratio by dividing the remaining figure, which would be signal, by the noise reading. Obviously, this system had many disadvantages such as requiring an excessive amount of calculation and necessitating removal of the signal during the actual noise reading.

It is thus an object of the present invention to provide a signal-to-noise ratio indicator in which there are no mental calculations to be made.

A further object is the provision of a signal-to-noise ratio indicator in which the signal need not be removed from the system at any time during measurement.

A still further object is to provide a signal-to-noise ratio indicator which yields a constant reading once calibrated for a given signal strength.

Yet another object of the present invention is the provision of a signal-to-noise ratio indicator which is simple to calibrate and operate.

According to the invention, the signal of interest is coupled to a pair of synchronous detectors. An oscillator at the same frequency as the signal of interest is coupled as the reference signal to the synchronous detectors, one being shifted by 90°. The outputs of the synchronous detectors will then yield in the unshifted channel the intelligence originally present on the incoming signal and in the shifted channel merely the noise present in that frequency band, since a synchronous detector does not yield the quadrature signals. The output from the in phase channel is then passed through a variable attenuator to a root-means-square detector, the output of which is metered. In order to calibrate a given signal, the variable attenuator is adjusted for a maximum or full scale reading on the output meter. When this has been accomplished the in phase channel is disconnected and the quadrature channel is connected to the input of the variable attenuator. The db drop from the signal plus the noise to the noise of the quadrature channel will then be indicated on the output meter and can be calibrated as a signal-to-noise ratio directly. A locking means is also employed to insure that the oscillator is in phase with the incoming signal. This is accomplished through the use of a phase detector susceptible to the outputs of the two channels or to an output of the oscillator and the incoming frequency which in turn controls a reactance tube. The reactance tube, of course, controls the frequency and phase of the oscillator.

Figure 2:
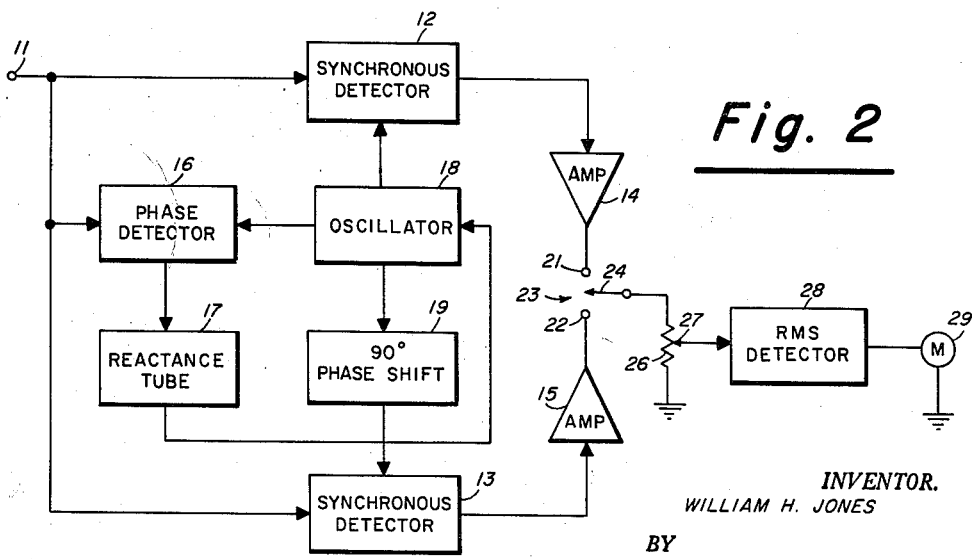

Other objects and many attendant advantages of this invention will be readily appreciated as the same becomes better understood by reference to following detailed description when considered in connection with the accompanying drawings in which like reference numerals designate like parts throughout the figures thereof and wherein:

FIG. 1 is a block diagram of one embodiment of the present invention; and
FIG. 2 is a block diagram of another embodiment of the present invention.

Referring to FIG. 1, there is shown input terminal 11 connected to the inputs of synchronous detectors 12 and 13 respectively. The outputs of synchronous detectors 12 and 13 are connected to the inputs of amplifiers 14 and 15 respectively, the outputs of which are connected to the inputs of phase detector 16. The output of phase detector 16 is coupled to reactance tube 17 which in turn is connected to oscillator 18. Oscillator 18 has one output connected to synchronous detector 12 and another output connected to phase shift network 19, the output of which is connected to synchronous detector 13. The outputs of amplifiers 14 and 15 are connected to contacts 21 and 22 of switch 23 respectively. Switch arm 24 of switch 23 is connected through resistance 26 to ground. Sliding contact 27 on resistor 26 is connected to the input of root-means-square detector 28, the output of which is connected to meter 29 the other side of which is grounded.

Referring to FIG. 2, the components are identical to FIG. 1, but the circuit arrangement is slightly different as shown by the drawing. The components of FIG. 2 operate in identical fashion as the components with the same number in FIG. 1.

Operation

Referring back to FIG. 1, an incoming signal is coupled to terminal 11 the signal to noise ratio of which is desired to be measured. This can be the output of a receiver IF strip or connected directly to a receiving antenna, etc. This signal is then coupled as signal inputs to synchronous detectors 12 and 13. Oscillator 18 is tuned to the frequency of the incoming signal at terminal 11. As is well known in the art, if the phasing of oscillator 18 is proper, the output of synchronous detector 12 will be the intelligence of the carrier of the signal present at incoming terminal 11. This signal which can be video for example is further amplified through amplifier 14 and coupled to one input of phase detector 16. The output of oscillator 18 is shifted 90° in phase shifter 19 and applied as a reference signal to synchronous detector 13. Also, as is well known in the art, the output of synchronous detector 13 will be the quadrature component of the incoming signal at terminal 11 which is zero, assuming an in phase condition of the incoming signal. Thus, the only output present at the output of synchronous detector 13 will be the noise in the frequency spectrum of the signal at input terminal 11. This noise is amplified in amplifier 15 and applied as a signal input to phase detector 16. It is pointed out here that the channel comprising synchronous detector 12 and video amplifier 14 is known as the I channel and the channel comprising signal detector 13 and video amplifier 15 will be referred to as the Q channel. The output of phase detector 16, if there is an input from the I and the Q channels, will control reactance tube 17 which will shift the phase and frequency of oscillator 18 until there is no signal output from synchronous detector 13 i.e., oscillator 18 will then be adjusted for optimum operation. The output from video amplifier 14 is then passed through switch 23 to resistance 26. Resistance 26 is utilized as a voltage attenuator, the output voltage of which is tapped off on sliding contact 27 and applied to the input of root-mean-square detector 28. The output of root-mean-square detector 28 is then indicated on meter 29. In operation contact 27 is adjusted with switch arm 24 contacting switch contact 21 until meter 29 indicates a full scale or zero db reading. After this adjustment is made, switch arm 24 is thrown in a downward position to contact 22 and the noise is then read as a db drop on meter 29. This can be calibrated directly as a signal to noise ratio since the meter is calibrated via adjustment of sliding contact 27 for each signal strength.

A second embodiment of the present invention is shown in FIG. 2. The blocks of FIG. 2 are identical to the blocks of FIG. 1 carrying the same numeral, the only difference being in the method in which oscillator 18 is phased in. In this case, the output from oscillator 18 is connected as a signal input to phase detector 16 and compared with the incoming signal at terminal 11. This in turn controls reactance tube 17 which again adjusts the phase and frequency of oscillator 18. The remainder of the hookup is identical to that of FIG. 1.

It is pointed out that oscillator 18 is tunable to the frequency at the incoming signal at terminal 11 in both embodiments, and that the gains of the I and Q channels are preadjusted to be equal.

Obviously, many modifications and variations of the present invention are possible in the light of the above teachings. It is therefore to be understood that within the scope of the appended claims, the invention may be practiced otherwise as specifically described.

What is claimed is:

1. A signal-to-noise ratio indicator comprising first and second synchronous detectors; each of said detectors having an input adapted for the application of a signal of interest, a reference input and an output; an oscillator adapted to produce a reference signal, means for connecting said oscillator to said reference input of said first detector, means coupled to said oscillator for phase shifting said reference signal 90 degrees, means for coupling said phase-shifting means to said reference input of said second detector, means coupled to said detector outputs for selecting either output, a root-mean-square-voltage detector having an input and an output, means for connecting said root-mean-square-voltage detector input to said selecting means, an amplitude indicator connected to said voltage-detector output, a phase detector having two inputs and an output, a reactance tube having an input and an output, means for connecting said first detector output to one of said phase detector inputs, means for connecting said second detector output to said other phase detector input, means for connecting said phase detector output to said reactance tube input, and means for connecting said reactance tube output to said oscillator.

2. A signal-to-noise ratio indicator comprising first and second synchronous detectors; each of said detectors having an input adapted for the application of a signal of interest, a reference input and an output; an oscillator adapted to produce a reference signal, means for connecting said oscillator to said reference input of said first detector, means coupled to said oscillator for phase shifting said reference signal 90 degrees, means for coupling said phase-shifting means to said reference input of said second detector, means coupled to said detector outputs for selecting either output, a root-mean-square-voltage detector having an input and an output, means for connecting said root-mean-square-voltage detector input to said selecting means, an amplitude indicator connected to said voltage-detector output, and means connected to said outputs of said synchronous detectors and to said oscillator for controlling the phase of said reference signal.

3. A signal-to-noise measuring system enabling constant monitoring of a desired signal comprising, first and second synchronous detectors, each detector having an input adapted for coupling to said desired signal, a reference input, and an output, means for generating a reference signal, said means having a first and a second output, means for connecting said first detector reference input to said generating means first output, means connected to said generating means second output and to said second detector reference input for phase shifting said reference signal 90 degrees, means connected to said detector outputs for selecting one of said outputs, a root-mean-square detector, attenuating means connected between said selecting means and said root-mean-square detector, an indicator connected to said root-mean-square detector and means connected to the outputs of said synchronous detectors and said generating means for regulating the phase of said reference signal.

4. A signal-to-noise ratio indicator comprising first and second synchronous detectors; each of said detectors having an input adapted for the application of a signal of interest, a reference input and an output; an oscillator adapted to produce a reference signal, means for connecting said oscillator to said reference input of said first detector, means coupled to said oscillator for phase shifting said reference signal 90 degrees, means for coupling said phase-shifting means to said reference input of said second detector, means coupled to said detector outputs for selecting either output, a root-mean-square-voltage detector having an input and an output, means for connecting said root-mean-square-voltage detector input to said selecting means, an amplitude indicator connected to said voltage-detector output, and means connected to said synchronous detector inputs and said oscillator for controlling the phase of said oscillator.

5. A signal-to-noise ratio indicator comprising first and second synchronous detectors; each of said detectors having an input adapted for the application of a signal of interest, a reference input and an output; an oscillator adapted to produce a reference signal, means for connecting said oscillator to said reference input of said first detector, means coupled to said oscillator for phase shifting said reference signal 90 degrees, means for coupling said phase-shifting means to said reference input of said second detector, means coupled to said detector outputs for selecting either output, a root-mean-square-voltage detector having an input and an output, means for connecting said root-mean-square-voltage detector input to said selecting means, an amplitude indicator connected to said voltage-detector output, means connected to said synchronous detector inputs and said oscillator for controlling the phase of said oscillator, and means connected to said synchronous detector inputs and generating means for controlling the phase of said reference signal.

References Cited in the file of this patent

UNITED STATES PATENTS

| | | |
|---|---|---|
| 2,578,348 | Gannett | Dec. 11, 1951 |
| 2,924,706 | Sassler | Feb. 9, 1960 |
| 3,012,200 | Hurvitz | Dec. 5, 1961 |
| 3,060,380 | Howels et al. | Oct. 23, 1962 |

FOREIGN PATENTS

| | | |
|---|---|---|
| 749,038 | Great Britain | May 16, 1956 |